United States Patent
Egerev et al.

(10) Patent No.: US 7,032,707 B2
(45) Date of Patent: *Apr. 25, 2006

(54) ACOUSTIC ISOLATOR DOWNHOLE APPLICATIONS

(75) Inventors: Sergey Egerev, Moscow (RU); Vladimir Belov, Moscow (RU); Vladimir Dubinsky, Houston, TX (US); Alexei Bolshakov, Houston, TX (US); Victor Tiutekin, Moscow (RU); Victor Yushin, Moscow (RU)

(73) Assignee: Baker Hughes Incorporated, Houston, TX (US)

( * ) Notice: Subject to any disclaimer, the term of this patent is extended or adjusted under 35 U.S.C. 154(b) by 328 days.

This patent is subject to a terminal disclaimer.

(21) Appl. No.: 10/610,940

(22) Filed: Jul. 1, 2003

(65) Prior Publication Data

US 2004/0104068 A1    Jun. 3, 2004

Related U.S. Application Data

(63) Continuation of application No. 09/583,258, filed on May 31, 2000, now Pat. No. 6,615,949.

(60) Provisional application No. 60/137,388, filed on Jun. 3, 1999.

(51) Int. Cl.
*G01V 1/40* (2006.01)
*G01V 1/44* (2006.01)

(52) U.S. Cl. .................. 181/102; 181/108; 367/25; 367/162

(58) Field of Classification Search .............. 181/102, 181/108, 111, 112, 119, 120, 115; 166/250.01, 166/250.16, 249, 254.2; 73/152.15, 152.16, 73/152.47, 152.58, 152.32; 367/25, 82, 911, 367/162; 340/855.6, 856.4

See application file for complete search history.

(56) References Cited

U.S. PATENT DOCUMENTS

| | | | | |
|---|---|---|---|---|
| 3,093,810 A | * | 6/1963 | Geyer et al. | 367/28 |
| 3,144,090 A | * | 8/1964 | Mazzagatti et al. | 367/155 |
| 3,190,388 A | | 6/1965 | Moser et al. | 181/5 |
| 3,191,143 A | | 6/1965 | Pardue | 340/17 |
| 4,020,452 A | | 4/1977 | Trouiller et al. | 340/17 R |
| 4,192,553 A | * | 3/1980 | Studebaker et al. | 299/2 |
| 4,872,526 A | * | 10/1989 | Wignall et al. | 181/102 |
| 5,036,945 A | | 8/1991 | Hoyle et al. | 181/104 |
| 5,043,952 A | | 8/1991 | Hoyle et al. | 367/159 |
| 5,063,542 A | * | 11/1991 | Petermann et al. | 367/166 |
| 5,170,018 A | * | 12/1992 | Potier | 181/101 |
| 5,171,943 A | * | 12/1992 | Balogh et al. | 181/102 |
| 5,229,553 A | * | 7/1993 | Lester et al. | 181/102 |
| 5,289,433 A | | 2/1994 | Cowles et al. | 367/34 |
| 5,343,001 A | | 8/1994 | Cowles et al. | 181/102 |
| 5,510,582 A | | 4/1996 | Birchak et al. | 181/12 |
| 5,728,978 A | * | 3/1998 | Roberts et al. | 181/102 |
| 5,852,262 A | * | 12/1998 | Gill et al. | 181/106 |
| 5,852,587 A | | 12/1998 | Kostek et al. | 367/25 |
| 6,082,484 A | * | 7/2000 | Molz et al. | 181/102 |
| 6,145,615 A | | 11/2000 | Beresford et al. | 181/102 |
| 6,564,899 B1 | * | 5/2003 | Arian et al. | 181/102 |
| 6,615,949 B1 | * | 9/2003 | Egerev et al. | 181/102 |
| 6,643,221 B1 | * | 11/2003 | Hsu et al. | 367/162 |
| 6,820,716 B1 | * | 11/2004 | Redding et al. | 181/106 |
| 6,834,743 B1 | * | 12/2004 | Arian et al. | 181/102 |
| 6,899,197 B1 | * | 5/2005 | Arian et al. | 181/102 |
| 6,915,875 B1 | * | 7/2005 | Dubinsky et al. | 181/102 |

FOREIGN PATENT DOCUMENTS

EP    0900918 A2    3/1999
GB    2311427 A     9/1997

* cited by examiner

*Primary Examiner*—Edgardo San Martin
(74) *Attorney, Agent, or Firm*—Maden, Mossman & Sriram, P.C.

(57) ABSTRACT

A plurality of heavy mass irregularities attached to an inner wall of the drill collar attenuate waves traveling through the collar. The plurality of heavy mass irregularities are spaced and sized for the maximum attenuation of acoustic pulses in a predetermined frequency range. The mass irregularities may be rings secured to the inner surface of the collar by neck pieces, extending outwardly from the outer circumference of the ring. The mass irregularities may be made of steel or tungsten and are between six and ten in number. The spacing of the irregularities may lie between twelve and fourteen centimeters. A center pipe may be included to isolate the irregularities from the fluid flow associated with the drilling operation. The pipe may be of a soft material such as rubber to reduce transfer of acoustic noise along the drill string. The irregularities may be in an oil based fluid with the pipe fitting closely in the center of the rings. In another embodiment of the invention, each of the mass irregularities is attached to the drill collar over substantially the entire length of the mass irregularity, enabling the attenuation of high frequencies. In yet another embodiment of the invention, the attenuator comprises a substantially cylindrical body with a plurality of recesses on the inside and/or outside of the cylindrica body, with the length of the recesses selected to provide attenuation within a specified band. In another embodiment of the invention, the attenuator comprises a plurality of sections each having an inner diameter and an outer diameter, each section acting like a waveguide with an associated passband and reject-band.

8 Claims, 8 Drawing Sheets

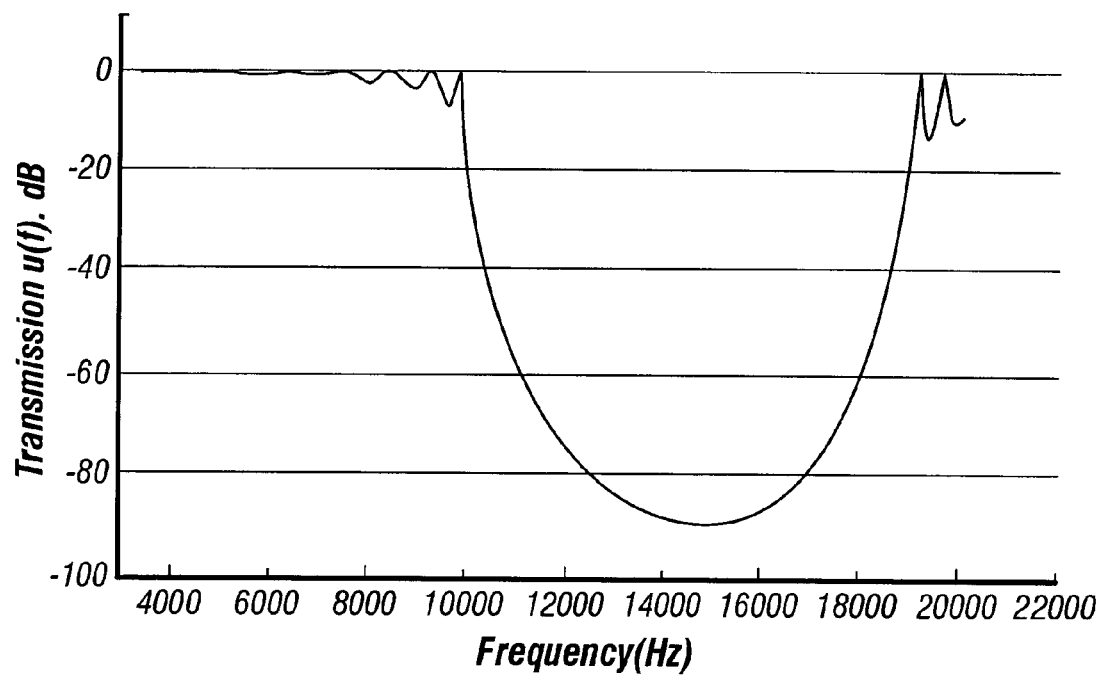
FIG. 6
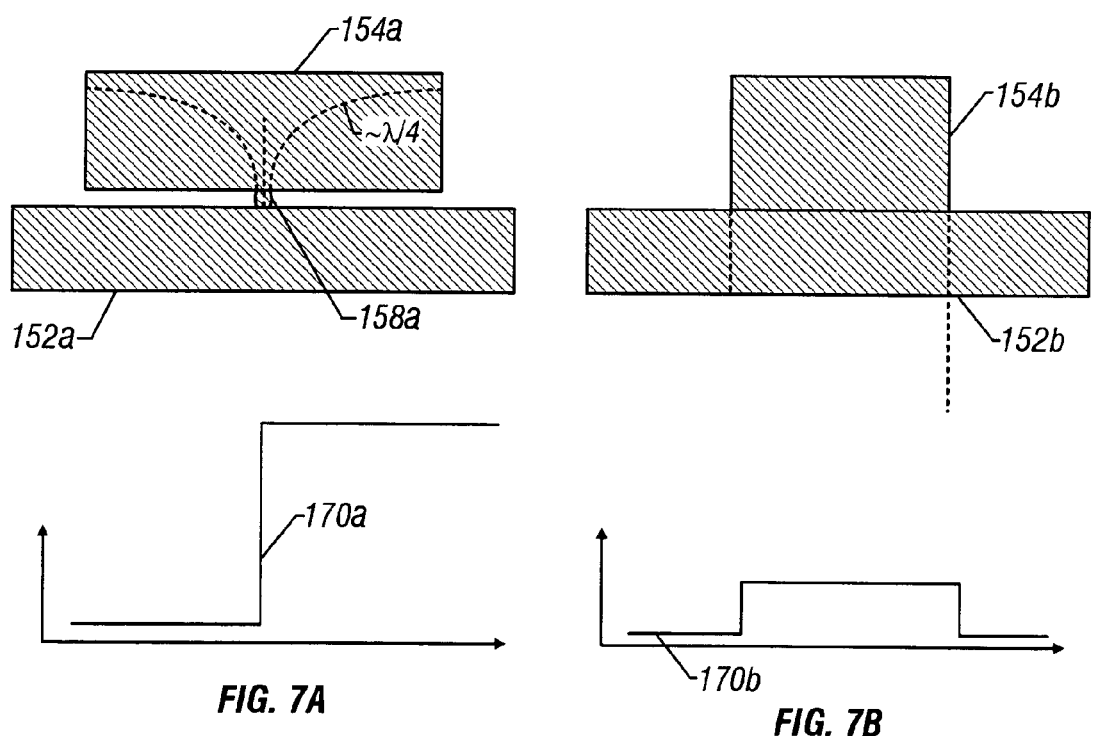
FIG. 7A
FIG. 7B

US 7,032,707 B2

ACOUSTIC ISOLATOR DOWNHOLE APPLICATIONS

CROSS-REFERENCES TO RELATED APPLICATIONS

The present application is a continuation of U.S. patent application Ser. No. 09/583,258, now U.S. Pat. No. 6,615,949 filed on May 31, 2000, which claimed priority from U.S. Provisional Patent Application Ser. No. 60/137,388 filed on Jun. 3, 1999.

BACKGROUND OF THE INVENTION

1. Field of the Invention

The present invention pertains to logging while drilling apparatus and more particularly to acoustic logging while drilling apparatus and attenuation of acoustic pulses that travel parallel to the direction of drilling.

2. Related Prior Art

To obtain hydrocarbons such as oil and gas, wells or wellbores are drilled into the ground through hydrocarbon-bearing subsurface formations. Currently, much current drilling activity involves not only vertical wells but also drilling horizontal wells. In drilling, information from the well itself must be obtained. While seismic data has provided information as to the area to drill and approximate depth of a pay zone, the seismic information can be not totally reliable at great depths. To support the data, information is obtained while drilling through logging while drilling or measuring while drilling (MWD) devices. Logging or measuring while drilling has been a procedure in use for many years. This procedure is preferred by drillers because it can be accomplished without having to stop drilling to log a hole. This is primarily due to the fact that logging an unfinished hole, prior to setting casing if necessary, can lead to washouts, damaging the drilling work that has already been done. This can stall the completion of the well and delay production. Further, this information can be useful while the well is being drilled to make direction changes immediately.

Advances in the MWD measurements and drill bit steering systems placed in the drill string enable drilling of the horizontal boreholes with enhanced efficiency and greater success. Recently, horizontal boreholes, extending several thousand meters ("extended reach" boreholes), have been drilled to access hydrocarbon reserves at reservoir flanks and to develop satellite fields from existing offshore platforms. Even more recently, attempts have been made to drill boreholes corresponding to three-dimensional borehole profiles. Such borehole profiles often include several builds and turns along the drill path. Such three dimensional borehole profiles allow hydrocarbon recovery from multiple formations and allow optimal placement of wellbores in geologically intricate formations.

Hydrocarbon recovery can be maximized by drilling the horizontal and complex wells along optimal locations within the hydrocarbon-producing formations. Crucial to the success of these wells is establishing reliable stratigraphic position control while landing the well into the target formation and properly navigating the drill bit through the formation during drilling. In order to achieve such well profiles, it is important to determine the true location of the drill bit relative to the formation bed boundaries and boundaries between the various fluids, such as the oil, gas and water. Lack of such information can lead to severe "dogleg" paths along the borehole resulting from hole or drill path corrections to find or to reenter the pay zones. Such well profiles usually limit the horizontal reach and the final well length exposed to the reservoir. Optimization of the borehole location within the formation also can have a substantial impact on maximizing production rates and minimizing gas and water coning problems. Steering efficiency and geological positioning are considered in the industry among the greatest limitations of the current drilling systems for drilling horizontal and complex wells. Availability of relatively precise three-dimensional subsurface seismic maps, location of the drilling assembly relative to the bed boundaries of the formation around the drilling assembly can greatly enhance the chances of drilling boreholes for maximum recovery. Prior art down hole devices lack in providing such information during drilling of the boreholes.

Modern directional drilling systems usually employ a drill string having a drill bit at the bottom that is rotated by a drill motor (commonly referred to as the "mud motor"). A plurality of sensors and MWD devices are placed in close proximity to the drill bit to measure certain drilling, borehole and formation evaluation parameters. Such parameters are then utilized to navigate the drill bit along a desired drill path. Typically, sensors for measuring downhole temperature and pressure, azimuth and inclination measuring devices and a formation resistivity measuring device are employed to determine the drill string and borehole-related parameters. The resistivity measurements are used to determine the presence of hydrocarbons against water around and/or a short distance in front of the drill bit. Resistivity measurements are most commonly utilized to navigate the drill bit. However, the depth of investigation of the resistivity devices usually extends only two to three meters and resistivity measurements do not provide bed boundary information relative to the downhole subassembly. Furthermore, the location of the resistivity device is determined by some depth measuring apparatus deployed on the surface which has a margin of error frequently greater than the depth of investigation of the resistivity devices. Thus, it is desirable to have a downhole system which can accurately map the bed boundaries around the downhole subassembly so that the drill string may be steered to obtain optimal borehole trajectories.

The relative position uncertainty of the wellbore being drilled and the critical near-wellbore bed boundary or contact is defined by the accuracy of the MWD directional survey tools and the formation dip uncertainty. MWD tools may be deployed to measure the earth's gravity and magnetic field to determine the inclination and azimuth. Knowledge of the course and position of the wellbore depends entirely on these two angles. Under normal conditions, the inclination measurement accuracy is approximately plus or minus two tenths of a degree. Such an error translates into a target location uncertainty of about three meters per one thousand meters along the borehole. Additionally, dip rate variations of several degrees are common. The optimal placement of the borehole is thus very difficult to obtain based on the currently available MWD measurements, particularly in thin pay zones, dipping formations and complex wellbore designs.

Until recently, logging while drilling has been limited to resistivity logs, gamma logs, neutron logs and other non-acoustic logs since acoustic noise caused by drilling and acoustic pulses traveling upstring from the transmitter has presented problems in accurate detection and delineation. These problems cannot be easily isolated by arrival time since the acoustic pulses are generated and detected continuously. Recently, the use of acoustic sensors having a relatively short spacing between the receivers and the transmitter to determine the formation bed boundaries around the downhole subassembly has been used. An essential element in determining the bed boundaries is the determination of the travel time of the reflection acoustic signals from the bed boundaries or other interface anomalies. A prior art proposal has been to utilize estimates of the acoustic velocities obtained from prior seismic data or offset wells. Such acoustic velocities are not very precise because they are estimates of actual formation acoustic velocities. Also, since the depth measurements can be off by several meters from the true depth of the downhole subassembly, it is highly desirable to utilize actual acoustic formation velocities determined downhole during the drilling operations to locate bed boundaries relative to the drill bit location in the wellbore.

Additionally, for acoustic or sonic sensor measurements, the most significant noise source is acoustic signals traveling from the source to the receivers via the metallic tool housing and those traveling through the mud column surrounding the downhole subassembly (tube waves and body waves). In some applications acoustic sensor designs are used to achieve a certain amount of directivity of signals. A transmitter coupling scheme with signal processing method may be used for reducing the effects of the tube wave and the body waves. Such methods, however, alone do not provide sufficient reduction of the tube and body wave effects, especially due to strong direct coupling of the acoustic signals between the transmitters and their associated receivers.

Some U.S. patents representative of the current art in determining subsurface formations are as follows.

U.S. Pat. No. 4,020,452, titled "Apparatus For Use in Investigating Earth Formations", issued to Jean-Claude Trouiller, et al., relates to an apparatus for mechanically filtering acoustic pulses in a well logging tool. This apparatus includes of a substantially rigid member having interruptions in the longitudinal continuity of the member. These interruptions provide tortuous paths for the passage of acoustic energy along the member. A plurality of masses are periodically spaced along the interior of the member and are each mechanically integral with opposite sides of the member at locations chosen to enable the member and masses to cooperate as a mechanical filter. By so doing, the structure made of the member and masses will have good acoustic delay and attenuation characteristics as well as good mechanical characteristics.

U.S. Pat. No. 5,043,952, titled "Monopole Transmitter For a Sonic Well Tool", issued to David C. Hoyle, et al., relates to a monopole transmitter for a sonic tool which includes an axial tube, a piezoceramic cylinder surrounding the axial tube, an endcap disposed at each end of and firmly contacting the cylinder, and an apparatus for holding the endcaps firmly against the axial tube. The endcaps firmly contact the axial tube without simultaneously contacting an upper bulkhead. The apparatus may include spring washers disposed between the bulkhead and at least one endcap, or it may include a spring disposed between a nodal mount and each endcap. A nodal mounting tube may be disposed around the axial tube, a ring being disposed at each end of the nodal mounting tube, each ring being disposed outside of the cylinder for biasing the endcaps in tension against a ring thereby holding each endcap firmly in contact against the axial tube.

U.S. Pat. No. 5,510,582, titled "Acoustic Attenuator, Well Logging Apparatus and Method of Well Logging", issued to James R. Birchak, et al., relates to a sonic well tool for performing acoustic investigations of subsurface geological formations penetrated by a borehole. The well tool generally includes a longitudinally extending body for positioning in the borehole. The tool also includes a transmitter supported by the body for transmitting acoustic energy and a receiver supported by the body for receiving acoustic energy. The tool includes an acoustic attenuation section positioned on the body between the transmitter and the receiver. This section includes one or more cavities defined by the body, inertial mass members positioned inside the cavities in a suitable manner to form a gap between the wall of the cavity and the inertial mass members, and an acoustical attenuation fluid in the gap. The method for attenuating sonic waves generally includes transmitting a sonic wave from the transmitter to the tool, passing the sonic wave through the acoustic attenuation section, and receiving attenuated wave at the receivers.

U.S. Pat. No. 5,036,945, titled "Sonic Well Tool Transmitter Receiver Array Including an Attenuation and Delay Apparatus", issued to David C. Hoyle, et al., relates to a sonic well tool that includes a transmitter array having at least one monopole transmitter and at least one dipole transmitter and a receiver array for receiving sonic pressure wave signals from a surrounding borehole formation. A first attenuation and delay apparatus is positioned above the receiver array and a second attenuation and delay apparatus is positioned below the receiver array in the sonic well tool. The first attenuation and delay apparatus includes an attenuation member comprising a plurality of interleaved rubber and metal like washers for attenuating compressional and flexural waves propagating along a metal center support rod to the receiver array and an inner housing comprising a bellows section having a corrugated shape and a thin transverse dimension for delaying the propagation of compressional and flexural waves along the inner housing to the receiver array. The second attenuation and delay apparatus includes a plurality of mass loading rings surrounding the outer housing of the sonic well tool for attenuating the flexural waves propagating up the outer housing from a sonic,transmitter ad a further inner housing including a further bellows section having a corrugated shape and a thin transverse dimension for delaying the propagation of compressional and flexural waves up the tool, along the inner housing, to the receiver array. The sonic well tool also includes a differential volume compensator for changing the quantity of oil encapsulated in the sonic well tool in accordance with changes in oil volume and changes in borehole temperature and pressure. The receiver array includes a plurality of hydrophone sets, each hydrophone set including at least one pair and preferably two pair of hydrophones disposed in a cross section of the tool, one hydrophone of a pair being disposed opposite the other hydrophone of the pair in the cross section.

U.S. patent application Ser. No. 09/201,988, now U.S. Pat. No. 6,082,484 to Molz & Dubinsky, having the same assignee as the present invention discloses the use of a section of a drill collar that has a plurality of shaped cavities filled with oil. The passage of an acoustic wave sets up a resonance of the fluid in the shaped cavity. The frequency of resonance depends upon the shape and size of the cavity and the properties of the fluid in the cavity. In one embodiment of the invention, the cavities are spherical. Another embodiment of the invention uses cylindrical cavities with a piston restrained by a spring within the cavity. Changing the spring constant provides additional control over the frequencies that are attenuated. The Molz patent also discloses the use of segmented isolators in which the drill collar section is filled with layers of a composite material in which the layers have a different density. The thicknesses of the individual layers is selected to attenuate certain frequencies.

SUMMARY OF THE INVENTION

The present invention provides a system and method for attenuation of acoustic waves that travel through a drill collar in a logging while drilling operation. The system includes a plurality of heavy masses attached to an inner wall of the drill collar. The heavy masses constitute mass discontinuities that attenuate waves traveling through the drill collar. In one embodiment of the invention, the mass discontinuities are rings and attachment is done by neck pieces. These neck pieces extend out from the outer circumference of the rings and may be an original outer circumference of the ring that has been milled down by cutting out portions of the ring. This allows significantly less than the entire outer circumference of the hanging rings to be in contact with the inner surface of the drill collar. Thus, the rings will more efficiently attenuate the vibrational force of the acoustic pulses coming in contact with the hanging ring. The plurality of heavy hanging rings are spaced and sized for the maximum attenuation of acoustic pulses in a predetermined range, preferably in the range of 10 khz to 20 khz. The system may include steel rings as the plurality of heavy hanging rings. In an alternate embodiment, the plurality of heavy hanging rings may be a heavier, more dense material such as tungsten. The plurality may have as many as ten rings or as few as six, with eight being another possibility. The spacing of the rings may vary between twelve and fourteen centimeters, depending on the material used. In a still further embodiment, a pipe may be placed within the inner circumference of the rings to isolate the attenuation rings from the flow of drilling mud. The isolation pipe may be of any material, however, a material that is non-rigid that is less likely to conduct vibrational forces is preferred. In another embodiment of the invention, the mass discontinuities are attached to the drill collar over a substantial portion of their individual axial lengths. Such an arrangement acts as a low pass filter. When this mechanical arrangement is used with an electrical bandpass filter in the tool, high frequencies are efficiently attenuated. In yet another embodiment of the invention, the attenuator section comprises a cylindrical body with sections of different inside and/or outside diameters to produce a ringed pipe: the sections of different diameter each have a characteristic passband and a reject band for attenuation of signals.

BRIEF DESCRIPTION OF THE DRAWINGS

FIG. 6 is a graphical representation illustrating the attenuation effect of the system of FIG. 1.

FIGS. 7a and 7b show a comparison of the invention of FIG. 2 with one in which the mass discontinuities are attached to the drill collar over a substantial length.

DESCRIPTION OF THE PREFERRED EMBODIMENT

Figure 1:
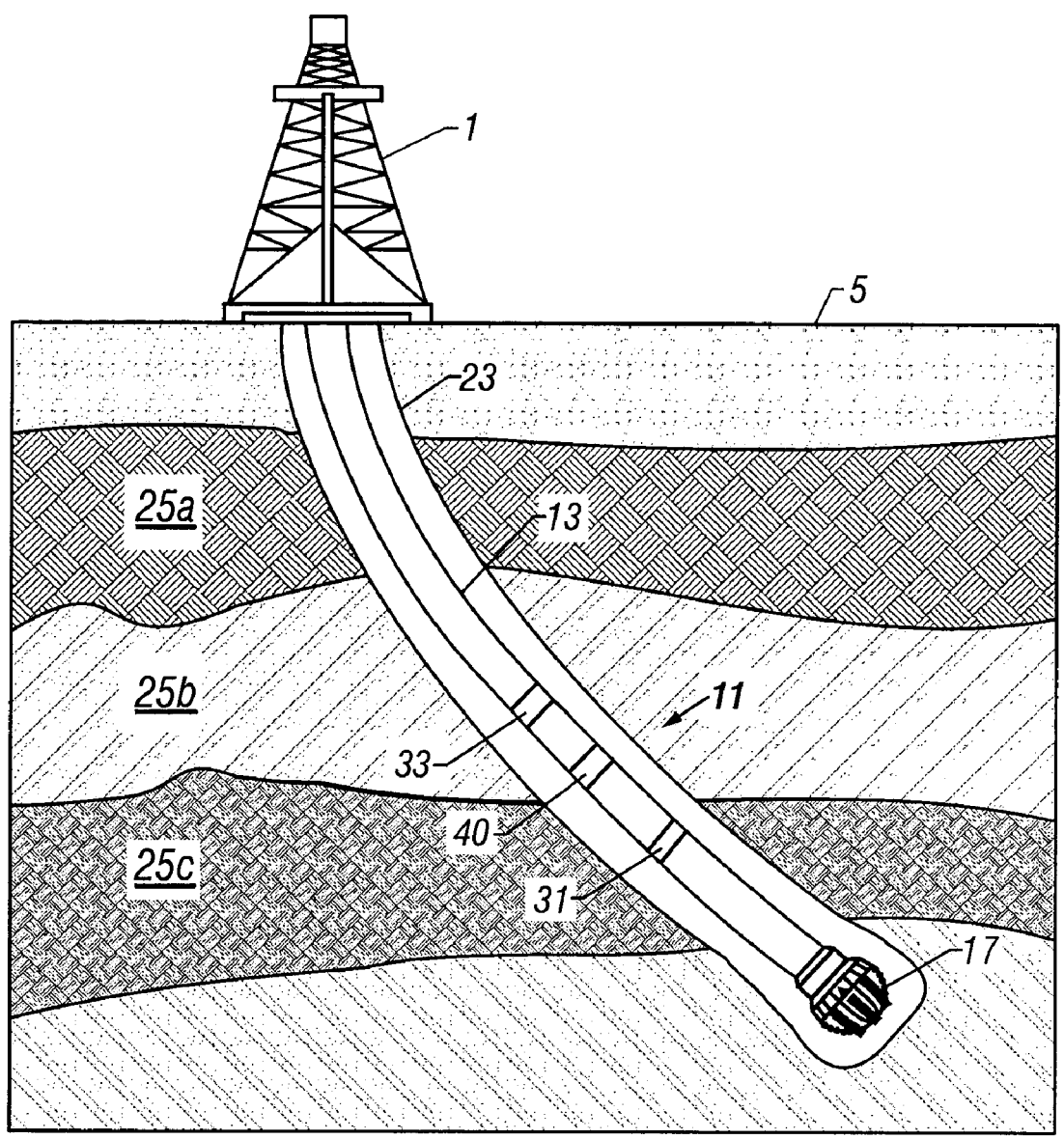
FIG. 1 is an illustration of a drill system having a measuring while drilling device mounted in the drilling apparatus.

The present invention provides a system and method for attenuating acoustic waves in a down hole tool that is being used to obtain information about subsurface formations, some of which are believed to be holding hydrocarbon deposits. FIG. 1 is a schematic illustration of the use of a Measurement-While-Drilling (MWD) apparatus while drilling a well. At the surface of the earth 5 a drilling rig 1 is used to drill a borehole 23 through subterranean formations 25*a*, 25*b*, 25*c* etc. Those versed in the art would know that a drillship or a platform could be used to drill a borehole into subterranean formations covered by a body of water. A drilling tubular 13, that could be made of drill pipes or coiled tubing is used to rotate a drillbit 17 at the bottom, the rotating action of the drillbit and axial pressure carving out the borehole. When coiled tubing is used for the drilling tubular, a drilling motor (not shown) is used to impart the necessary rotary motion to the drillbit.

A variety of transducers are used downhole in a sensor assembly 11. This sensor assembly makes measurements of properties of the formations through which the borehole is being drilled. These could include electromagnetic, gamma ray, density, nuclear-magnetic resonance, and acoustic sensors. For illustrative purposes only, an acoustic transmitter array 31 and an acoustic receiver array 33 are indicated. Those versed in the art would recognize that other configurations of the acoustic transmitters and receivers could be used.

Figure 2:
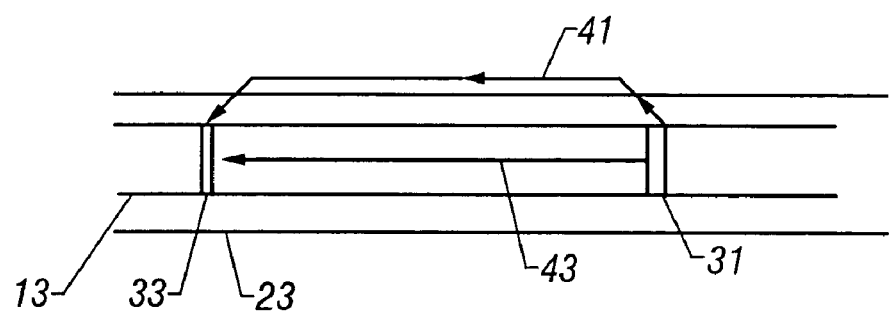
FIG. 2 illustrates raypaths of acoustic signals between the transmitter and the receiver.

Turning now to FIG. 2, the transmitter 31 and the receiver 33 are shown inside the borehole 23. The annulus between the drilling tubular 13 and the borehole 23 is filled with a drilling fluid. The fluid is conveyed down the borehole inside the drilling tubular to the drillbit and returns up the hole via the annulus. Excitation of the transmitter produces acoustic signals. A portion of the signal, denoted by the raypath 43, is referred to as the direct arrival and travels through the tool to the receiver. The transmitter also produces an acoustic signal in the borehole fluid that enters into the formation. One portion of it, illustrated by the raypath 41 travels as a body wave through the formation and carries information about the formation that it traverses. The receiver also detects other signals, such as tube waves that involve a coupled wave between the fluid and the formation, Stoneley waves that are surface waves in the fluid, and signals reflected from acoustic reflectors within the formation.

In an MWD tool, as in wireline tools, the body wave 41 through the formation usually arrives before the tube wave and the Stoneley wave. However, in an MWD tool, the direct arrival 43 through the tool commonly arrives before the desired signal component 41 that carries information about the acoustic properties of the formation. In addition, the drillbit 17 itself is continuously generating acoustic signals traveling through the drilling tubular 13. Consequently, it becomes very difficult to determine a travel time for the formation body wave 41.

In order to attenuate the direct arrival 43, the tool a pulse attenuator 40 is located in tool 11 between transmitter 31 and an receiver 33. Only one transmitter and receiver are illustrated for demonstration. In practice, there may be several receivers and transmitters and the present invention operates with any arrangement, the only requirement is that attenuator 40 be located between the transmitter and the receiver.

In one embodiment of the invention, the acoustic isolator is based upon an array of mass rings attached to the inner wall of the drilling collar. Such an array presents an interference filter providing a stop band at a predetermined frequency for longitudinal sound waves propagating along the walls of a collar. The device exhibits sufficient damping within the predetermined frequency range as well as good mechanical strength. The efficiency of an isolator of this type increases proportionally to the number of the rings N as well as to the ratio $M/\mu$, where M is the mass of a single ring, $\mu$ is a mass per unit length of the collar. Hence, the efficiency of the isolator is very sensitive to even minor changes in outer dimensions of the pipe as well as to the changes in demands to its wall thickness.

The attenuation provided by the isolator section is designed to be minus forty decibels within the frequency range of twelve through eighteen kilohertz. The isolator design satisfy the mechanical requirements specified concerning the limitations on inner diameter, outer diameter, minimal cross section area and others.

Figure 3:
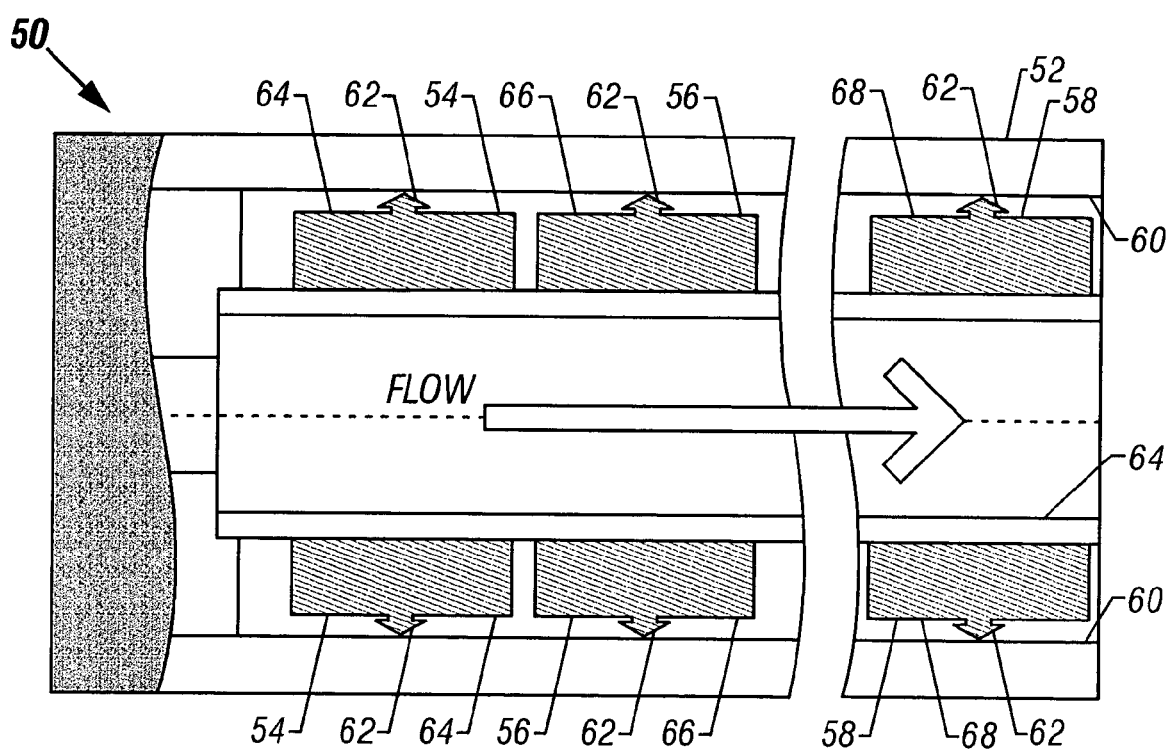
FIG. 3 is an illustration of an attenuation system for use on a well drilling collar.

FIG. 3 is a partial illustration of an attenuation system 50 for a sound tool (not shown) in a drill collar 52 using an array of hanging mass irregularities 54, 56, 58 . . . (may include up to ten elements) mounted on inner wall 60 of drill collar 52. Mass irregularities 54, 56, 58, . . . are secured to inner wall 60 by neck pieces 62 which extend out from outer circumference 64, 66, 68, . . . of mass irregularities 54, 56, 58, . . . respectively. Neck pieces 62 are smaller both in depth and width than outer circumferences 64, 66, 68, . . . of mass irregularities 54, 56, 58, . . . so that mass irregularities 54, 56, 58, . . . are held firmly against inner wall 60, but not so firmly that acoustic pulses traveling through drill collar 52 are transferred without attenuation. In this manner, mass irregularities 54, 56, 58, . . . are held firmly but not tightly.

In an alternate embodiment, an inner pipe 64 may be provided to protect array of mass irregularities 54, 56, 58, . . . from mud flow. Inner pipe may be of any material to isolate mass irregularities 54, 56, 58 . . . from the mud flow, however, a material that is non-rigid and has a degree of flexibility is preferred. A material that is less likely to transfer acoustic pulses toward the receivers is desired.

The operation of the attenuation filter may be understood by the following discussion. The attenuator section has N mass irregularities or elements, each element having the shape of rings or donuts attached to the inner surface of a pipe at the points $x=x_j$, (where j=1, . . . n). The origin of coordinates coincides with the first irregularity, i.e. $x_0=0$. The mass of a ring j is $m_j$. The distance between two neighboring elements is:

$$l_j = x_{j+1} - x_j.$$

At $x > x_n$, an incident longitudinal sound wave of a unit amplitude traveling towards the origin of coordinates may be denoted by $$pe^{-i[k(x-x_n) - \omega t]}$$

where
  k=ω/c is a wavelength constant,
  ω=2πf is an angular frequency,
  c=the velocity of sound.

Due to the presence of an array there exists (at $x > x_n$) a reflected wave $p_r = V_n(\omega)e^{ik(x-x_n) - i\omega t}$, where $V_n(\omega)$ is a reflection coefficient for an array of n irregularities. In the present invention, the dimensions of irregularities are small as compared with the wave length at a given frequency $\omega = 2\pi/k$. The density $\rho$ as well as linear mass of a pipe $\mu$ are also of great importance in the attenuation. In the present invention, the mass $m_j$ is much greater than $\mu h_j$, where $h_j$ is the length of attachment zone for the mass $m_j$. Such an array presents an interference filter providing a stop band at a predetermined frequency range for longitudinal sound waves propagating in the walls of a pipe.

In the solution of a wave equation, the length of a contact zone, $\Delta l$, between a ring and an inner wall of a pipe is small as compared to the wavelength of interest $\lambda$. Under these circumstances the propagation of the longitudinal wave can be described by the following differential equation:

$$YS\frac{\partial^2 u}{\partial x^2} - \mu \frac{\partial^2 u}{\partial t^2} - M_j \frac{\partial u^2}{\partial t^2}\delta(x - x_j) = 0 \tag{1}$$

Where:
  Y is the Young's modulus of the pipe material,
  S is the cross section area of the pipe wall,
  u is the displacement,
  $\mu$ is the linear mass of the pipe, and
  x is the longitudinal coordinate.

When considering propagation of a sinusoidal wave, the displacement u may be represented by a function of the form $u(x)\exp(-i\omega t)$, where, $\omega$ is the angular frequency, The differential wave equation then takes the form:

$$YS\frac{\partial^2 u}{\partial x^2} + \mu\omega^2 u + M_j\omega^2 u\delta(x - x_j) = 0 \tag{2}$$

For an array of N mass irregularities, the solution takes the form $$u(x) = Ae^{ikx} - \sum_{j=1}^{N} b_j G(x - x_j)u(x_j) \tag{3}$$

where,
  A is an initial wave amplitude,
  $G(x-x_j)=\exp(ix/x-x_j/)/(2ysk)$ is Green function, and
  $b_j=M_j\omega$ is the magnitude of an irregularity.

Hence the transmission coefficient at a position x that is greater than $x_n$ can be found as: $T=u(x)/A$, which may be expressed in decibels using the usual conversion factor.

The transmission coefficient of the array may also be obtained by other methods. One such method is an impedance approach, the relative input impedance is given by the formula:

$$Z_{in}=(p/\nu\rho c)$$

where:

p=pressure,
c=velocity of sound in the medium,
v=vibrational velocity, and
ρ=density.

For an array of N elements, the impedance is calculated with the help of the following recurrence procedure:

$$Z_{in}^{j+1} = \frac{Z_{in}^j - i\tan(kl_j)}{1 - iZ_{in}^j\tan(kl_j)} - i\frac{km_j}{\mu}, j = 1, 2, \ldots N$$

Figure 4:
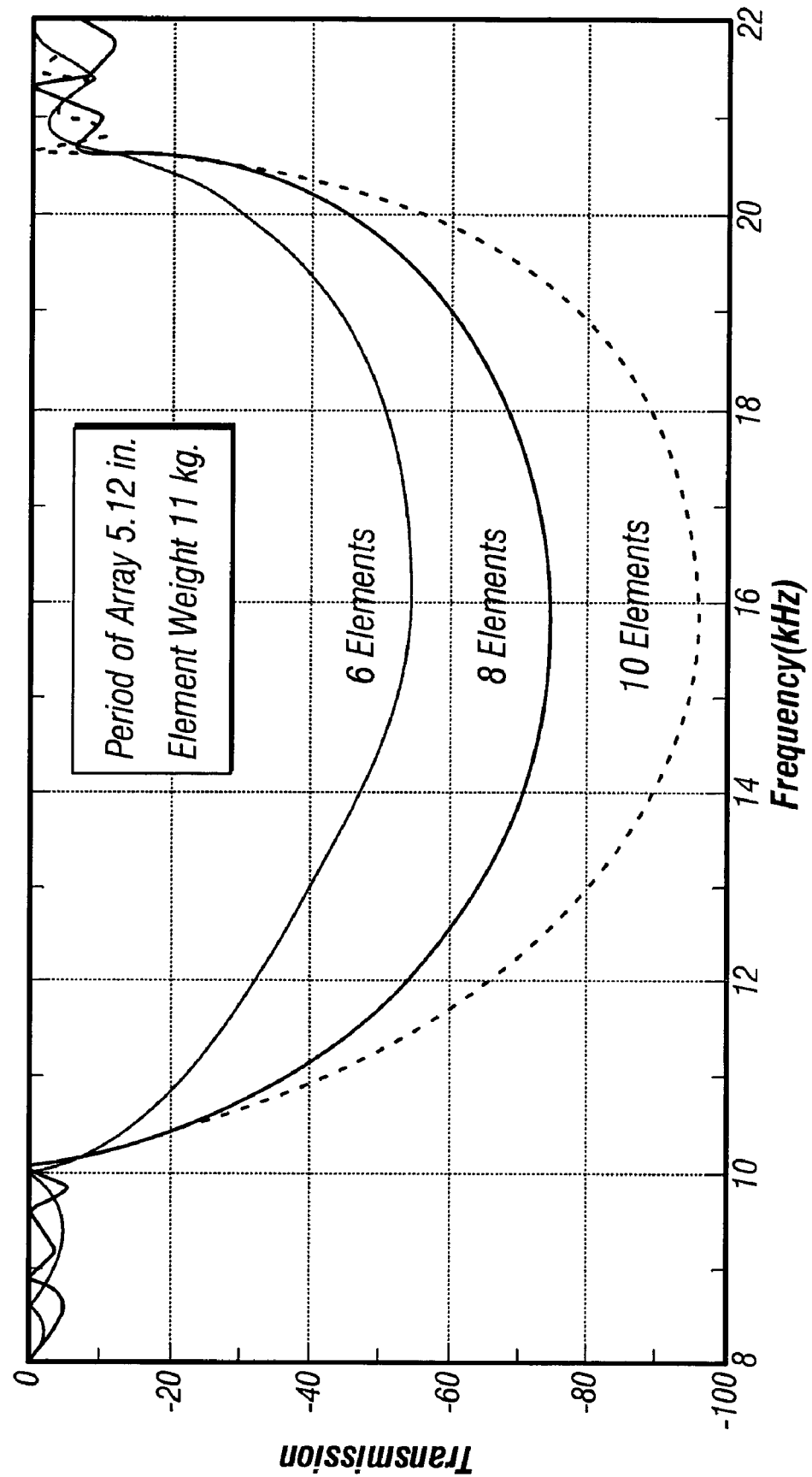
FIG. 4 is a graphical representation illustrating the effects of an increased number of attenuation elements of a system as that illustrated in FIG. 1.
Figure 5:
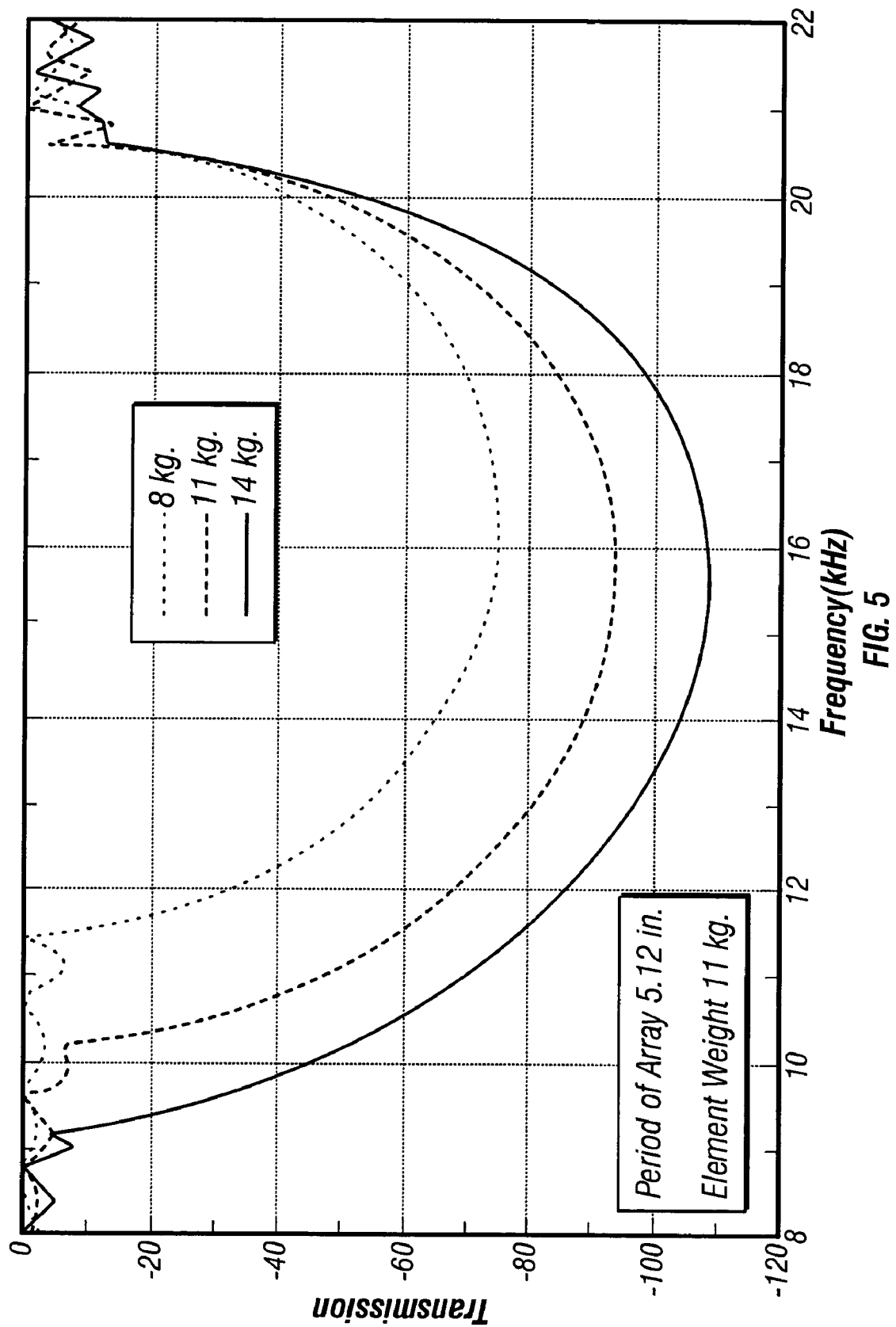
FIG. 5 is a graphical representation illustrating the effects of increasing the weight of attenuation elements of a system as that illustrated in FIG. 1.

FIGS. 4 and 5 illustrate plots of transmission vs. frequency. The influence of the number of elements is illustrated in FIG. 4. Transmission curves are shown for six elements, eight elements and ten elements. The increase in the number of elements only slightly changes the transmission curve at the borders of the predetermined frequency band. However, the attenuation values of the transmission curves in the middle of the frequency band are greatly affected. The period of an array 1 is important to place the transmission curves at the proper frequency. In the preferred embodiment an optimal value for the spacing between elements is 5.12 inches or approximately thirteen centimeters for the inner and outer diameter used. However, other spacings such as fourteen or twelve centimeters may also be used and provide acceptable results. The influence of the mass of a single element is illustrated in FIG. 5.

FIG. 4 illustrates attenuation curves for arrays of ten elements. Each curve is for elements of different weights. A first curve is for ten elements, each weighing eight kilograms, the second for elements weighing eleven kilograms and a third for elements weighing fourteen kilograms. An increase in the mass M results in changing the low frequency border. The high frequency border remains essentially unchanged. All the transmission curves show that transmission loss exceeds forty decibels within the predetermined frequency band between twelve and eighteen kilohertz.

The calculations were performed for an array of N identical equally spaced irregularities. Transmission coefficient was calculated vs. frequency within the frequency range from five to twenty kilohertz.

FIG. 6 is a graphical representation of the attenuation of a preferred embodiment of the present invention. In the preferred embodiment, ten elements were used with a spacing of thirteen centimeters between elements. Rings of stainless steel were used as mass irregularities 54, 56, 58 . . . . It can be seen that the arrangement of the preferred embodiment provides attenuation of waves in the range of eight to eighteen kilohertz. By using his system, interference of waves traveling through the collar of a drilling tool can be greatly reduced and acoustic logging is possible during a drilling operation.

FIGS. 7a and 7b show a comparison between the embodiment discussed above with respect to FIG. 2 and an alternate embodiment of the invention using a different arrangement of attaching the mass discontinuities to the drill collar. Shown in the upper portion of FIG. 7a is a drill collar 152a to which a mass 154a is attached by means of a neck 158a. This corresponds to the arrangement discussed above with reference to FIG. 2. Shown in the upper portion of FIG. 7b is an alternate arrangement in which a mass 154b is attached to the drill collar 152b over substantially the full length of the mass. Shown in the lower portion of FIG. 7a is a schematic representation of the effective mass discontinuity 170a as seen by a propagating wave: typically, such a mass discontinuity provides approximately 6 to 8 dB of attenuation of the wave. The lower portion of FIG. 7b shows the effective mass discontinuity 170b as seen be a propagating wave: effectively, an attenuation of 2–3 dB of attenuation is provided at each boundary. By an analysis such as discussed above with respect to equations 1–4, the arrangement of FIG. 7b is shown to act as a low pass filter. By suitable choice of the spacing and size of the weights, the effective cutoff frequency can be made to be around 10 kHz. When used in combination with an electrical bandpass filter (not shown) on the tool, body waves through the drill collar may be effectively attenuated.

Figure 8A:
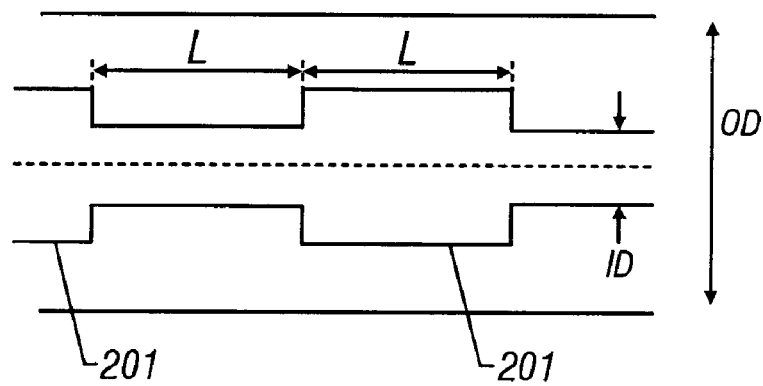
FIGS. 8a–8c show alternate embodiments of the invention in which attenuation is accomplished by means of recesses that produce mass discontinuities in a body of the attenuator.
Figure 8B:
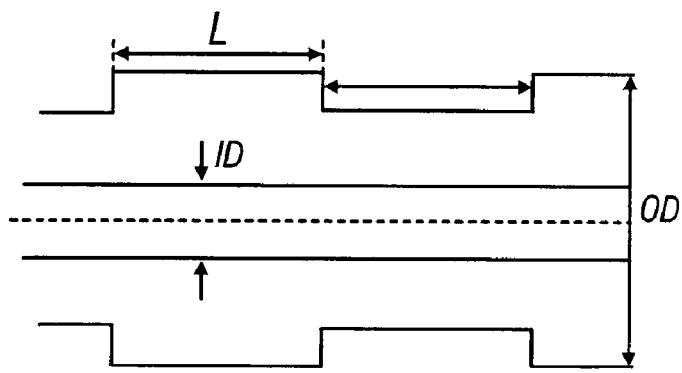
Figure 8C:
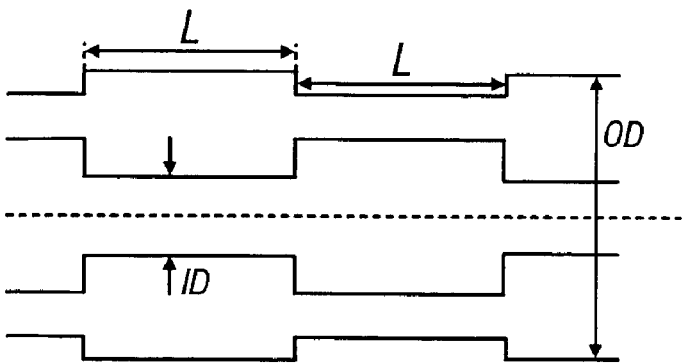

FIGS. 8a–8c show alternate embodiments of the invention in which the isolator comprises a machined cylindrical member. In FIG. 8a, the cylindrical member has an outer diameter of OD and an inner diameter of ID. The inner diameter allows passage of drilling mud. The inside wall if the cylindrical member has recess of length L therein. A body wave encounters regions of different cross sectional areas and mass densities, similar to the embodiments discussed above, resulting in attenuation of body waves.

FIG. 8b shows an arrangement in which the recess are on the outside of the isolator whole FIG. 8c shows an arrangement in which there are recess on both the outside and the inside of the isolator.

Figure 9:
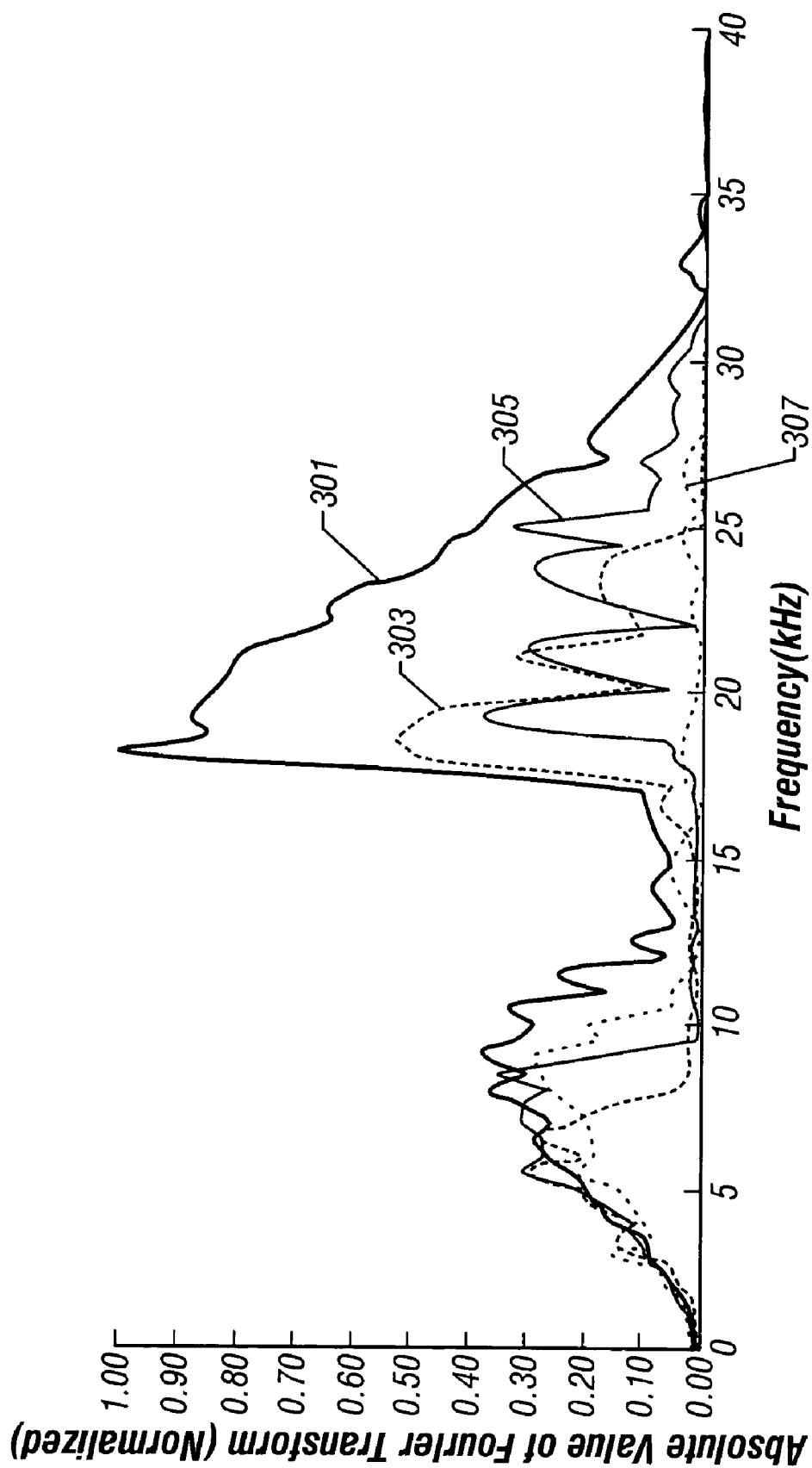
FIG. 9 shows a comparison of frequency spectra of attenuators having different types of recesses having a fixed length.

FIG. 9 shows the results of a finite element ("FE") simulation of the various embodiments shown in FIGS. 8a–8c. The abscissa is the frequency and the ordinate is the normalized amplitude of waves passed by the attenuator. Note that the amplitude scale is linear, rather than being in decibels. The curve 301 shows the spectrum for a cylindrical pipe. The curve 303 shows the spectrum for cuts on the inside of the pipe, 305 is for recesses on the inside and outside of the pipe while 307 is for recesses on the outside of the pipe. Similar FE simulations have been carried out for various lengths L of the recesses. Based upon these simulations, for an OD of 7.09", in a preferred embodiment of the invention, a value of L of 3.15" (8.5 cm) with recesses on both the inside and the outside of the isolator is used.

Figure 10:
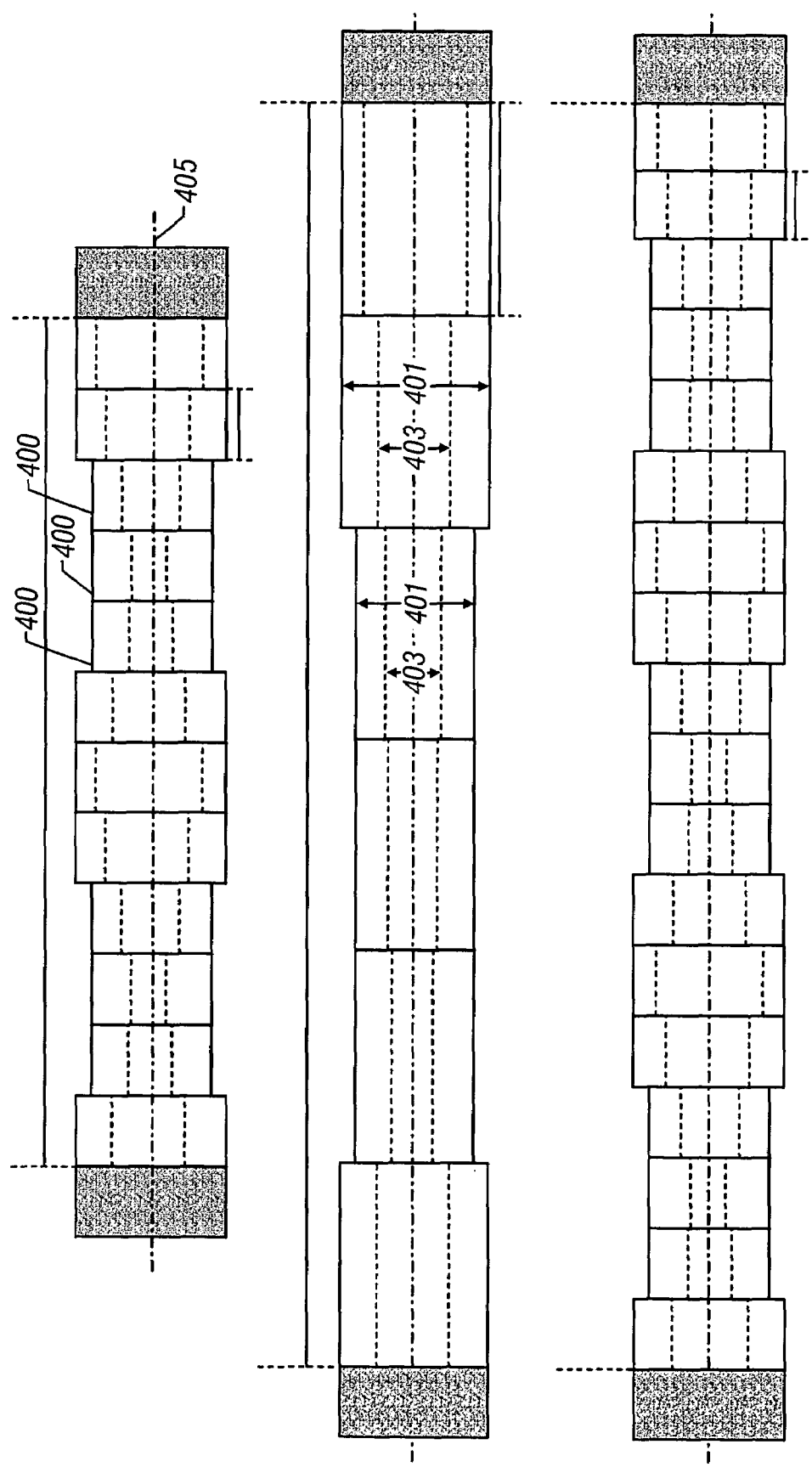
FIG. 10 shows alternate embodiments of the invention in which the diameter of the attenuation sections is varied.

The results in FIG. 9 are for a plurality of equally spaced recesses having the same length and the same depth of the recesses. Other embodiments of the invention use a combinations of sections having different lengths and different depths of inner and outer recesses. Examples are shown in FIG. 10. Each section 400 may be considered to be a waveguide with an associated pass-band and a reject band determined by the inner diameter 403 and the outer diameter 401. As may be seen in FIG. 10, each section has an axis parallel to the longitudinal axis 405 of the body of the attenuator. By using such a combination of different inner and outer diameters, a broad range of frequencies may be attenuated. This attenuation is in addition to the attenuation produced by reflections between adjacent sections 400. In the presence of borehole fluid on the inside and outside of the sections, the waveguides are "leaky" waveguides that allow energy to propagate into the fluid. In a preferred embodiment of the invention, the inner diameters range from 2" to 6" and the outer diameter ranges from 4" to 10".

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

The invention claimed is:

1. A system for attenuation of acoustic waves traveling through a longitudinal member capable of transmitting said acoustic waves therethrough comprising:

a plurality of spaced-apart masses firmly attached to an adjacent inner wall of said longitudinal member, each said plurality of masses having a predetermined spacing and a predetermined maggnitude for attenuation of acoustic pulses in a predetermined frequency range.

2. The system for attenuation of acoustic waves according to claim 1 wherein said plurality of masses comprises a material selected from (i) steel rings, and, (ii) tungsten rings.

3. The system for attenuation of acoustic waves according to claim 2 wherein said plurality of masses is between six and ten.

4. The system according to claim 1 further comprising a center pipe fitting closely against an inner periphery of said masses for preventing contact between a borehole fluid and said plurality of masses.

5. The system according to claim 4 wherein said center pipe is constructed of rubber.

6. The system according to claim 1 wherein said spacing of the masses is within the range of twelve to fourteen centimeters.

7. The system according to claim 1 wherein the masses comprise metal rings attached to the inner wall of the longitudinal member by neck pieces extending outward from an outer circumference of the rings.

8. The system according to claim 1 wherein each of said plurality masses is attached to the longitudinal member by at least one neck piece.

* * * * *